United States Patent

Reitz

[11] Patent Number: 5,904,977
[45] Date of Patent: May 18, 1999

[54] ELECTROSET COMPOSITE ARTICLES AND PROCESS

[75] Inventor: Ronald P. Reitz, Hyattsville, Md.

[73] Assignee: The United States of America as represented by the Secretary of the Navy, Washington, D.C.

[21] Appl. No.: 08/107,047

[22] Filed: Aug. 17, 1993

Related U.S. Application Data

[63] Continuation of application No. 07/810,545, Dec. 19, 1991, abandoned, which is a continuation of application No. 07/593,149, Oct. 5, 1990, abandoned, which is a continuation-in-part of application No. 07/405,178, Sep. 11, 1989, Pat. No. 5,194,181.

[51] Int. Cl.$^6$ .................................................... B32B 3/26
[52] U.S. Cl. ............................... 428/304.4; 428/317.9; 428/201; 428/206; 428/209; 428/323; 428/411.1; 428/457; 442/221; 442/222; 442/224
[58] Field of Search .............................. 428/209, 210, 428/901, 457, 458, 459, 460, 461, 462, 411.1, 304.4, 317.9, 323, 201, 206; 252/500; 442/221, 222, 224

[56] References Cited

U.S. PATENT DOCUMENTS

| | | |
|---|---|---|
| 2,417,850 | 3/1947 | Winslow .................................. 192/21.5 |
| 3,047,507 | 7/1962 | Winslow .................................. 192/21.5 |
| 4,258,100 | 3/1981 | Fujitani et al. ....................... 428/316.6 |
| 4,301,040 | 11/1981 | Berbeco ................................. 428/317.9 |
| 4,505,973 | 3/1985 | Neet et al. ............................ 428/317.9 |
| 4,664,100 | 5/1987 | Rudloff ..................................... 128/79 |
| 4,707,231 | 11/1987 | Berger ..................................... 204/164 |
| 4,772,407 | 9/1988 | Carlson ...................................... 252/74 |
| 4,782,927 | 11/1988 | Sproston et al. ....................... 192/21.5 |
| 4,900,387 | 2/1990 | Johnson ............................... 156/272.2 |
| 4,996,109 | 2/1991 | Krieg et al. .......................... 428/317.9 |
| 5,087,511 | 2/1992 | Locey ................................... 428/319.3 |
| 5,190,624 | 3/1993 | Reitz ....................................... 252/500 |
| 5,194,181 | 3/1993 | Reitz ....................................... 252/500 |
| 5,213,713 | 5/1993 | Reitz ....................................... 252/500 |
| 5,232,639 | 8/1993 | Reitz ....................................... 252/500 |

OTHER PUBLICATIONS

Kirk Othmer, Encyclopedia of Chemical Technology, 3rd Ed. vol. 7, 1980, p. 729.
Coombs, Jr. "Printed Circuits Handbook" 3rd Ed, McGraw Hill, 1989 pp. 31.3–31.9.

*Primary Examiner*—Marie Yamnitzky
*Attorney, Agent, or Firm*—Howard Kaiser

[57] ABSTRACT

A process for fabrication of composite articles using electroset materials. Conductive substrates are formed defining the shape of the product to be formed. Electroset material is placed between the substrates and the substrates energized by high voltage. Fluid between the conductive portions of the substrates is under the Winslow effect whereas fluid between nonconductive portions of the substrate is not so affected. The fluid between conductive portions is retained by the Winslow effect and cured.

20 Claims, 8 Drawing Sheets

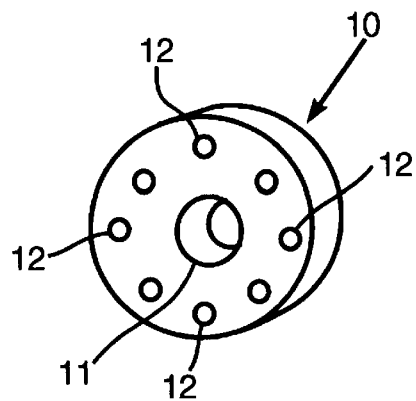
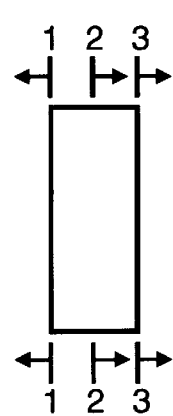
FIG. 1　　　　　FIG. 2
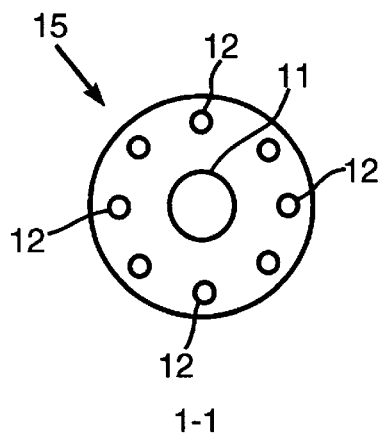
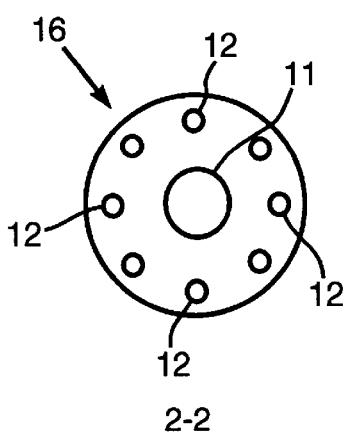
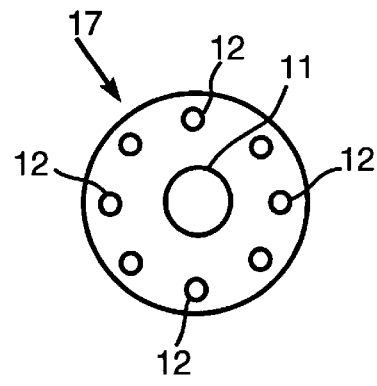
FIG. 3
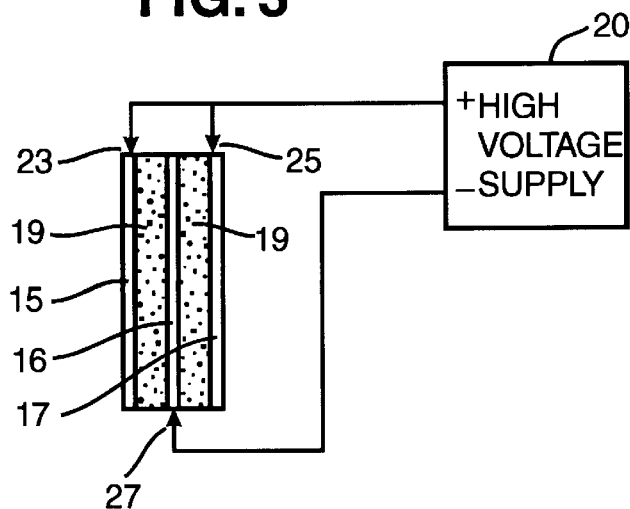
FIG. 4

ELECTROSET COMPOSITE ARTICLES AND PROCESS

CROSS REFERENCE TO RELATED APPLICATIONS

This application is a continuation of application Ser. No. 07/810,545, filed Dec. 19, 1991, now abandoned, which is a continuation of application Ser. No. 07/593,149, filed Oct. 5, 1990, now abandoned, which is a continuation-in-part of application Ser. No. 07/405,178, filed Sep. 11, 1989 and issued Mar. 16, 1993 as U.S. Pat. No. 5,194,181, entitled Process for Shaping Articles from Electrosetting Compositions.

STATEMENT OF GOVERNMENT INTEREST

The invention described herein way be manufactured by or for the Government of the United States of America without payment on any royalties thereon or therefor.

BACKGROUND OF THE INVENTION

1. Field of the Invention

This invention relates to the field of flexible manufacturing of parts and more particularly to the field of shaping of parts from fluids which change from a liquid to a solid during a curing phase and still more particularly to the shaping of parts by means of an electric field.

2. Background Information

It is known to construct molds having a volume and an exterior form for retaining a liquid molding compound, to place liquid in these volumes, to allow the liquid to cure and then to remove the form, thereby revealing the article. In order to mold an article in this manner, it is first necessary to have a pattern for the article or a mold made with an interior conforming to the shape of the article. In U.S. Pat. No. 5,194,180, the disclosure of which is hereby incorporated by reference, it is taught that an electroset article can be formed by making a conductive mold having at least two electrode surfaces and that this mold can be used in conjunction with an electroset fluid to accelerate the production of articles. This copending application also teaches electroset materials which are usable in an electroset mold. Electroviscous fluids refer to fluids which exhibit the property of increased viscosity when the fluid is subjected to an electric field. One phenomenon for electrically controlling the viscosity of a fluid is commonly known as the Winslow effect. The term Winslow effect refers to the phenomenon of electrically controlling the viscosity of a fluid comprising a suspension of finely divided electrically polarizable matter in a dielectric fluid by subjecting the fluid to an electric field. Within this disclosure and the appended claims, the finely divided electrically polarizable matter is referred to as aggregate.

Numerous types of electroviscous fluids and aggregates are disclosed in my copending applications referenced above as well as in the prior art. Electroviscous fluids and aggregates for electroviscous fluids are disclosed in the prior art in U.S. Pat. Nos. 4,687,589; 3,427,247; 3,970,573; 3,984,339; 4,502,973; 4,737,886, the disclosures of which are hereby incorporated by reference.

It is known that molded articles can be made by pouring a phase changing vehicle into a form, allowing the vehicle to set or cure and then removing the molded article from the mold. As used herein the term phase changing vehicle applies to any composition which changes state from a flowable to a less flowable or solid state when such compositions cure or set in the normal course of their use. Numerous commercially available compositions are available which exhibit such phase changing characteristics, examples of which are hereinafter disclosed. These include vehicles made from mixing multipart constituents which chemically react and vehicles having a contituent or a composition of constituents which reacts with its surroundings such as for example air.

It has been found that aggregates as are suitable for use as aggregates in electroviscous fluids may be advantageously put to other purposes. When a suitable electroviscous fluid aggregate is added to a phase changing vehicle, an electroviscous fluid is formed whereby the fluid is susceptible of being held in place by the Winslow effect during the time of phase change of the composition. Suprisingly, it has been found that a composition comprising electroviscous fluid aggregate in a phase changing vehicle will, when the composition is subjected to an electric field, set or cure much more rapidly than the same composition sets or cures when not under the influence of an electric field. The phenomenon of accelerated curing of such a composition is referred to as the second Reitz effect.

Within this disclosure and the appended claims, the term electroset composition is used to relate to a composition which is susceptible to being shaped or cured by influence of an applied electric field.

An electroset composition comprises a phase changing vehicle and an electrically polarizable aggregate. The term aggregate is used in the collective to include a multiplicity of polarizable particles. The composition is responsive to an applied electric field in that the field cooperates to hold the material in place while the material cures and to drastically accelerate the cure of the material.

One aggregate as disclosed in my copending application Ser. No. 07/219,522 (now abandoned) was tested and found to be useful for the purposes of the present invention. Thereafter, it was found that aggregates other than those of my copending application were also useful in forming electroset compositions in accordance with the present invention. Consequently it is expected that any of the aggregates disclosed in my copending application as well as any of the aggregates disclosed in the prior art as generally useful for making electroviscous fluids are also generally useful as aggregates for forming electroset compositions. Aggregates suitable for use in an electroset composition include those suitable for use as aggregates for electroviscous fluids.

Preferably the phase changing vehicle has good dielectric properties so that current flow in the electric field is kept to a minimum. Also, it is preferable if the density of the aggregate particles is matched to the density of the phase changing vehicle so that the paticles are maintained uniformly suspended in the composition.

The advantages of the compositions and methods will be readily understood by those skilled in the art in the light of this disclosure. While it is known that many materials may be initially fluid enough to be injected into a mold and permitted to harden into solids, many of these materials have slow cure times, that is, they do not harden rapidly into an identifiable and transportable form. On the other hand, an electroset composition can be cast into a mold and held in place and cured by the application of an electric field.

Another advantage is that the materials of the invention may have their cure rate electrically determined, accelerating the cure with a high potential, low energy consumption electric field as opposed to accelerating the cure by conventional means such as heating the material and its surrounding area or adding additional catalyst. The accelerated cure overcomes another objections to curing material in the conventional way. For example, some moldable materials give off an offensive odor as they cure. Such a material is RTV silicone rubber which gives off a pungent acetic acid odor as it sets and cures. Accelerating the cure reduces the time that these odors will be offensive to persons in the surrounding area.

Yet another advantage is that with electric field curing, the cure rate tends to be constant through the thickness of a shape. Most phase changing vehicles tend to cure more rapidly on the surface than regions in the interior of the shape. In application Ser. No. 07/589,836 entitled PROGRAMMABLE ELECTROSET MATERIALS AND PROCESSES, filed Sep. 19, 1990 (now abandoned), the disclosure of which is hereby incorporated herein by reference, the formulation and processing of electrically programmable electroset materials is taught. In an electrically programmable material as disclosed therein, end product properties of a cured material are determined by controlled electric power applied to the material during the curing phase.

In copending applications, the term electroviscous aggregate has been used to describe an aggregate which, when placed in a dielectric liquid, causes the combination of fluid and aggregate to behave electroviscously. In the present application, the term electrorheological aggregate is used in similar manner.

Electroset materials, in accordance with the present invention, comprise, castable fluid compounds such as, for example, fluid polymers and ceramics that can be caused to set and cure electrically or wherein the set and cure rate is electrically controllable. The present invention comprises electroset material that have electrically controllable end product properties. These electrically controllable end product properties include physical, structural properties, electrical properties and the end-product shape.

In my copending application Ser. No. 07/405,178 U.S. Pat. No. 5,194,181), a class of materials identified as electroset compositions was disclosed. In that application, the electroset compound was disclosed comprising a a phase changing vehicle (i.e. a castable material) and an electrorheological aggregate suitable for making the phase changing fluid electroviscous. At the time of filing the copending application Ser. No. 07/405,178, it was believed that the sole effect of applying an electric field to the electroset compound was to accelerate the cure of a compound that would otherwise cure in its normal mode of application without benefit of any specific acceleration mechanism.

It has since been determined that the physical characteristics such as for example density and specific gravity of certain electroset compounds are susceptible to influence by an applied electric field during the cure time of the material. Two part epoxy type compounds which cure by exothermic reaction are especially useful as the phase changing vehicle. Further, it has been determined that the density of the cured material may either be isotropic or anisotropic. Isotropic density means that the incremental density of the cured material remains about the same through out the volume of the cured material. Anisotropic density means that the incremental density of the cured material has readily observable different values at different parts of the volume of the cured material.

Herein the term electroshaped materials shall refer to the materials comprising any object deriving its shape, at least in part, from the application of an electric field to those materials. Thus, while it is cooling and undergoing a phase change from fluid to solid, a thermoplastic material or other phase changing vehicle with electrorheological aggregate dispersed therein can derive its shape by means of its immersion in an electric field.

Materials made in accordance with the present invention have controllably different physical end product properties. In this disclosure, the term "end product properties" refers to those properties of the material after the material has fully cured. The end product properties of the present invention can be made relatively homogenous throughout the electroset material, or alternatively, anisotropic.

The present invention is useful and advantageous in the fabrication of polymeric articles. One such article that may be advantageously manufactured using the compositions and processes of the present invention is shoe soles and portions of shoe soles. In accordance with the present invention, shoe soles are fabricated with a great variety of chosen compressibilities. Applying an electric field to properly formulated electroset material shaped in the form of a shoe sole while the electroset material is undergoing phase change from fluid to solid, will not only accelerate the cure of the sole but will alter the overall compressibility of the resultant sole. Changing the applied electric field alters the obtained compressibility of the sole. Also by selective application of field strength to various parts of the sole, the compressibility of some portions of the sole are made selectively different from other parts of the sole.

The present invention provides an advantageous means of altering the properties of a fabricated shoe sole not found in the prior art. In prior art manufacturing of castable polymer shoe soles required that the formulation of the castable polymer be changed in order to significantly change the shoe sole compressibility. Such a change in formulation requires the time consuming and messy job of recalculating the proportions of polymer constituents to be mixed, measuring out these new proportions of polymer constituent materials and then mixing. Often, the newly reformulated polymer is incompatible with the constituents of the prior polymer. This necessitates care to ensure that the prior polymer constituents and those of the new polymer are not accidently mixed together.

The materials of the present invention, on the other hand, do not need to be reformulated in order to yield changes in the desired properties of the shoe soles. Merely changing the applied electric field accomplishes this purpose. There is no need for recalculating the proportions of the polymer constituents. Furthermore, there is less likelihood in mixing constituents that should not be mixed together. Furthermore, this time consuming process is eliminated. It is taught in the co-pending applications that phase changing vehicles modified to be susceptible to the Winslow effect, can be accelerated in their cure and modified in their properties by application of an electric field during the curing phase. Electroset molds in accordance with the co-pending application are limited, however.

BACKGROUND EXAMPLES OF PROGRAMMING

Several electroset materials were fabricated and tested to determine their end-product physical properties. During the process of electrosetting the materials, a Glassman 30 kilovolt (kv), 50 milliamp (ma) high voltage power supply, Model PS/PH030P050, serial 149470 Master/slave/AHV was used to energize the electroset material fluid. This power Supply has the convenient features of both a tunable current limiter dial, which limits the maximum allowable output current and a tunable voltage limiter dial, which limits the maximum allowable output voltage. Each dial also has an adjacent corresponding milliamp meter and kilovolt meter, respectively. Hereinafter, unless otherwise specified, this supply was used in all tests of sample materials in accordance with the various examples.

The sampling probes used comprise two electrode plates, similar to those mentioned my copending application Ser. Nos. 07/219,522 and 07/219,523 (both now abandoned), with dimensions of about 1.0 in.×1.5 in (2.5 cm×3.8 cm) and made of aluminum. The electrode plates were separated by a wooden strip about one inch (2.5 cm) wide and 0.2 in. (0.5 cm) thick and secured to the wooden strip by tape leaving a portion of the aluminum electrodes extending about one inch (about 2.5 cm) beyond the wooden strip in an approximately parallel relationship. An electrical wire was conductively attached to each of the electrodes and one wire connected to the positive polarity and one wire connected to the negative polarity of the high voltage power supply. When electrosetting the following example materials, the electrodes were immersed into the electroset material while the material was in a fluid state and then the electrodes were energized.

BACKGROUND EXAMPLE 1

Fifty (50) ml of polyester resin, sold under the Marineyard Resin brand name and produced by Kardol in Miami, Fla., was mixed in a glass beaker with 50 ml edible cornstarch and one ml of an acrylic floor finish marketed under the brand name Giant by Giant, Inc., Landover, Md. When this mixture appeared fairly homogeneous to the eye, 15 drops of a curing agent, Liquid Hardener Reactor, comprising methyl ethyl ketone peroxide in dimethyl phthalate (MEKP) were added to the mixture and again mixed well for about 1 minute. The sampling probe was then immersed into the mixture. The power supply voltage and current dials were used to set the maximum allowable voltage to 3 kv and the maximum allowable current to 5 ma per square inch area of electrode surface area. After several minutes of immersion in the mixture under these conditions, the mixture between the electrodes was found to have hardened. This sample was then measured for its overall density using a weighing scale and the Archimedes method of density measurement.

Other samples of the mixture were also mixed and tested in a similar manner as the first sample. The same experimental conditions were held for these samples as those in the first sample fabrication except for the maximum allowable current. In each case of sample fabrication, the maximum allowable current was varied from all previous samples. After separation from the electrodes, each sample was measured for its density. The results obtained are given in table 1.

TABLE 1

PHYSICAL PROPERTIES V.S. MAXIMUM ALLOWED CURRENT AT 3 KV MAX VOLTAGE

| Sample Number | Maximum Allowed Current ma/in.$^2$ | ma/cm$^2$ | Specific Gravity g/cc | Measured Hardness Shore 'D' |
|---|---|---|---|---|
| 1 | 5.0 | 0.787 | 0.852 | 55 |
| 2 | 4.0 | 0.629 | 0.925 | 60 |
| 3 | 3.33 | 0.524 | 0.967 | 63 |
| 4 | 2.0 | 0.496 | 1.110 | 72 |

TABLE 1-continued

PHYSICAL PROPERTIES V.S. MAXIMUM ALLOWED CURRENT AT 3 KV MAX VOLTAGE

| Sample Number | Maximum Allowed Current ma/in.$^2$ | ma/cm$^2$ | Specific Gravity g/cc | Measured Hardness Shore 'D' |
|---|---|---|---|---|
| 5 | 1.33 | 0.314 | 1.150 | 76 |
| 6 | 0.667 | 0.209 | 1.190 | 82 |
| 7 | 0.000 | 0.000 | 1.280 | 82 |

The data clearly demonstrate the variance in the end product property of density. These density variations are clearly a function of the amount of electric current permitted to pass through the samples at the 3 kV potential. These tests were repeated several times and equivalent results were obtained each time, clearly demonstrating the ability to electrically program into the electroset material a desired density within a range of values.

After the density measurements shown in Table 1 were obtained, the samples were cut open and examined. A number of voids was found within the less dense samples. Numerous voids were observed within the least dense sample while none were found within the most dense sample. The amount of observable voids within the samples varied as a function of sample density, so that, for example, the amounts found within samples 3 and 4 were less than those of sample 1 and more those found in sample 6. Sample 7, it was observed, had no discernable void embedded within it.

It is not yet apparent which, if any, theories may be correct in explaining the presence of increased heating in the curing material or voids in the cured material. The phenomenon may be better explainable by some yet to be postulated theory. What is known is that the electrosetting with included voids occurs as a function of electrical current flow through the curing material and the passage of current causes the release of a gas or vapor useful as a blowing agent to cause the voids.

Regardless of the reason the foaming or bubbling occurred, it was observed. The amount of observed foaming and the amount of voids later found in the samples was indeed electrically controlled. Thus, example 1 provides an example of a material with electrically activated and electrically controlled foaming in an electroset material.

Before each of the samples was examined for the presence of voids, its property of material hardness was measured. Measurements of material hardness were performed with a Rex Durometer instrument, type 'D' model standard dial which is produced by the Rex Gauge Co. in Glenview Ill. This gauge bears U.S. Pat. No. 2,421,449 and was used in compliance with standard hardness measurement practices. The measured hardness of samples are also shown in Table 1. The hardness number shown is the average of 10 measurements for each sample.

The data of table 1 shows that the overall end product hardness of the electroset material is an inverse function of applied electric power. The more electric power applied to this electroset material during its cure, the lower the end product hardness.

Conclusions drawn from the data clearly demonstrate that the formulation disclosed has electrically controllable end product properties. Both sample density and hardness were found to be electrically controlled.

BACKGROUND EXAMPLE 2

Another material comprising an epoxy with the brand name Two Ton Epoxy and manufactured by the Devcon Corp., was purchased at a local hobby shop. This Two Ton Epoxy is a two part epoxy comprising a resin and a hardener. Normal working time, the so-called pot life, is about 30 minutes for this material after equivalent parts of resin and hardener are mixed. A 25 ml quantity of the resin was mixed with 30 ml of cornstarch and 3 ml of Giant brand acrylic floor finish. This was then mixed with a 25 ml quantity of the Two Ton Epoxy hardener. After mixing by hand for approximately 1 minute, an electrode probe as described above was immersed in the mixture. The maximum output voltage of the high voltage power supply was set to 3 kv and the maximum current output was set at 5 ma.

After several minutes it was observed that the material between the probe electrodes had electroset into a solid. The probe was removed and replaced by another clean probe of the same type and dimensions. Two other samples were taken, under the same conditions the first except that the maximum applied current was changed to 2.5 ma and 0.0 ma, respectively. The resulting samples were weighed and their densities calculated from their volume. The density results are shown in Table 2.

TABLE 2

| | MEASURED DENSITY | | |
|---|---|---|---|
| | Maximum Current | | Specific Gravity |
| Sample number | ma/in$^2$ | ma/cm$^2$ | (g/cc) |
| 1 | 5.0 | 0.78 | 0.94 |
| 2 | 2.5 | 0.39 | 1.06 |
| 3 | 0.0 | 0.00 | 1.15 |

As with the samples of example 1, the samples of example 2 were broken apart after density was determined. As in example 1, the samples of example 2 that were electroset had observable voids in them. Furthermore, sample 1 electroset with 5.0 ma/in$^2$ maximum current had significantly higher amounts of observable voids than the others. Sample 3 had no observable voids while sample 2 had a number of the voids. Both the visible inspection and the density data for the formulation of Example 2 again indicate the electrical programmability and electrical control of the end product properties.

BACKGROUND EXAMPLE 3

A two part polyurethane comprising a first part resin and a second part hardener and sold under the brand name REN RP 6402 and commercially available from CIBA-GEIGY Corp. in East Lansing Mich. was mixed with powdered carbon in the form of graphite in the proportions of about 100 parts by weight of hardener; about 35 parts by weight of resin; and about 3 parts by weight carbon powder. It was observed that this mixture was a black viscous fluid. The two part polyurethane as commercially sold has a normal pot life or working time of about 30 minutes at room temperature. The carbon powder was manufactured by Gougeon Brothers, Inc., Bay City, Mich. and sold under the West System brand name as 423 Graphite by Oceana, a marine supply company in Annapolis, Md.

After mixing a first sample of material was poured into a mold. After pouring the mixture into the mold, the plates were electrically connected to the high voltage power supply and energized and the supply was set for a maximum output voltage of about 3 kv and maximum current output of 5 ma. Bubbling and foaming of the material as it electroset were observed, causing some material to be discharged from the mold. The material hardened with continued applied electric power. After about 10 minutes, the material had electroset in place, drawing no measurable current.

Similarly, a second sample of the composition was fabricated and electroset. After electrosetting sample number 2 with the 3 kv maximum voltage and a 2.5 ma maximum applied current, sample 2 was measured for its electrical resistance. The time required for the second sample to electroset was about 15 minutes and some foaming during the electroset process was observed. The observed amount of foaming, however, was less than that noted in the fabrication of sample 1.

A third sample was fabricated in the same manner as in the first two samples. However, no high voltage was applied to the electroset material fluid, consequently the current was zero. No foaming was observed during the setting of sample 3.

The samples were then removed from their molds and their specific gravity measured. The data is listed in Table 3 in association with the applied current and the cure or set time.

TABLE 3

SPECIFIC GRAVITY, COMPRESSIBILITY AND SET TIME AS FUNCTION OF CURRENT DENSITY

| Sample Number | Maximum Current ma | Specific Gravity (g/cc) | Compressibility $\Delta t/t$ | Set Time (minutes) |
|---|---|---|---|---|
| 1 | 5.0 | 0.824 | .39 | 10 |
| 2 | 2.5 | 0.919 | .25 | 15 |
| 3 | 0.0 | 1.03 | .16 | 30 |

After the density measurements were made, the samples were cut open and examined. It was found that all three samples had some voids within the material. Sample 1 had by far the most observable amount of voids. Sample 3 had the least and sample 2 had an amount less than that of sample 1 but greater than sample 3. The voids in sample 3 were observed to be appreciably smaller in both number and size in comparison to those found in samples 1 and 2. The relative amount of foaming corresponded to the relative maximum allowable current flow and subsequently to the amount of voids present in the electroset sample.

Also, an effect was observed for samples 1 and 2, the samples which were electroset, which was not observed with sample 3, the sample which was allowed to set without applying electrical current. It was noted that samples processed in accordance with sample 3 were easily separated from the electrodes after the material had set and cured. This was expected because the mold release agent had been used in the molds just prior to pouring the electroset material fluid. The mold release worked and the finished end product sample was easily separated from its electrodes. Easy release was not the case with samples 1 and 2. Repeatedly, it was found that this example composition when electroset older the conditions for samples 1 and 2 was only easily separated from one of the two electrodes. It was repeatedly observed that one of the two electrodes could be pulled off the electroset material solid (i.e. the solidified end product) by hand. The other electrode was always much more difficult to separate from the electroset material solid. The samples had to be pried off of the second electrode.

Examination revealed that samples 1, 2 and 3 of example 3 varied in their relative compressibility (i.e. their squeezability). This was done by placing the samples between the fingers, squeezing hard and then noting how much the sample would compress. Sample 1 could be compressed in its thickness to about 50 percent of its origin thickness. As the fingers released the sample, the sample returned to original thickness. Using this same method, sample 2 compressed to about 75 percent of its original thickness. Sample 3, which had the least amount of voids also compressed the least. It compressed to only about 90% of its original thickness.

Subsequently, compression tests were performed using an Instron Model 1325 Servo Hydraulic Machine. For each or samples 1, 2 and 3, a 100 pound force was applied to one surface of an opposing pair of surfaces while the other surface rested against a plate. The change in thickness of the material as a result of applying the 100 pounds force was measured. The relative compressibility of the samples is indicated by the ratio $\Delta t/t$ where $\Delta t$ is the change in thickness and t is the uncompressed thickness. The results of these tests are shown in Table 3. The compressibility of the material was identified as being a function of the increasing amount of voids in the samples. The location of the voids in the example samples appeared relatively uniform throughout the body of each electroset sample.

Materials that have been formed from electroset compositions using the electroset process have unique properties.

It is appreciated that there are many other electroset compounds and mixtures that can be made to have electrically programmable and electrically controllable physical properties. Material properties such as electrical resistivity, density, hardness, adhesion and compressibility are all electrically controllable by means of the present invention.

It is known that images of objects to be manufactured are generated in computer systems and various views and sections of the object are displayed on a screen or outputed on an output device such as a printer or plotter. It is advantageous in manufacture if these views and sections are converted directly into an object by filling in the space between views and sections with a castable material and determining the shape of the features of the object without first fabricating a pattern in the shape of those features and without fabricating a cavity denoting the features of the object.

SUMMARY OF THE INVENTION

In accordance with the present invention, three dimensional objects are fabricated by preparing conductive images representing a plurality of views or sections of the object to be manufactured; filling the volume between adjacent images with an uncured electroset material; applying electrical potential between the images causing the material to solidify by the Winslow effect; removing such material that is not under influence of the Winslow effect; and, maintaining the voltage potential applied to the material that is solidified via the Winslow effect until the electroset material cures. Such images may be prepared in planar form by well known means such as cutting or stamping or alternately by depositing images on a plurality of insulating substrates. The voltage potential may either be applied between adjacent images or in any manner that results in sufficient field strength to make the Winslow effect operative. In one embodiment of the present invention, the images are generated by a properly programmed digital computer and transferred to an insulating substrate by an output imaging device such as a pen plotter or, alternately, a laser printer. The image is recorded on the substrate with conductive ink in the case of a pen plotter or, alternately, by electrically conductive powder in the case of a laser printer. The ink or powder is made conductive by a suitable additive such as for example, graphite, aluminum coated hollow glass microspheres, or semiconductive materials such as silicon or germanium. The substrate may be any good insulating material compatible with the material to be electroset such as for example epoxy, polyurethane or silicone rubber, or alternately may be an open weave or closed weave electrically conductive cloth. It is not necessary that the pattern of conductivity that defines the image be of 100 percent density. A density of less than 100 percent is satisfactory as long as the material limits of the part are fully defined and substantially all of the lines are interconnected. Nonconductive cloth is also used between conductive images to form a composite structure.

The present invention makes it possible to controllably electrically program the shape of articles obtained from both room temperature castable materials and even thermoplastic and thermoceramic materials. Electroshaped materials are used in conjunction with one or more computers. A computer is used in the design and fabrication of a spare part or prototype object in the manner that a computer is currently known to design and generate engineering documentation for an object. Such documentation such as drawings of an object and the use of computers to generate such drawings are well known art. The manner in which a computer is used to electroshape material will be discussed in the description of the preferred embodiments. However, as will be readily appreciated in the light of this disclosure, the present invention has many advantages over prior art means of manufacture.

In accordance with the present invention, objects of different shapes are fabricated in remote locations, using universal tools and materials positioned at that location. Programmable molding of electroshaped materials, can, in many cases, eliminate the need for lathes or other capital machinery used in part manufacture. Money and time can be saved because of the elimination of the necessity to buy and ship such equipment. The cost of skilled labor in operating such equipment is also reduced. By use of the present invention, money and time can be saved by electronically transmitting data and fabricating the part at a remote site rather than having to pay for the cost and await the time of the shipping of the part. Part designs can be stored by means such as for example a computer disk and easily referenced for production or reproduction years after the part is designed or first fabricated. This eliminates the need to store bulky engineering drawings, fixtures and tooling. Furthermore, the designs can be standardized on the disks to reduce variances in a batch of manufactured parts.

The invention disclosed herein is especially useful in the fabrication of composite articles wherein cross section conductive images are formed with one or more conductive layers such as for example a conductive fabric.

Electroset materials usable with the present invention are disclosed in U.S. Pat. No. 5,194,181 and in application Ser. No. 07/584,836 filed Sep. 19, 1990 (now abandoned), entitled PROGRAMMABLE ELECTROSET MATERIALS AND PROCESSES, the disclosures of which are hereby incorporated by reference. Significant properties of the materials disclosed therein which are advantageously exploited in the apparatus and process of the present invention include cure time accelerated by exposure to an electric field and changes in mechanical properties resulting for curing the material in the presence of an electric field. Although these are important, another physical property, that of shape, is also programmable in accordance with the present invention. It is therefore an object of the invention to provide means for electrically shaping objects. Other objects, advantages and features of this invention will become apparent from the following detailed description of the invention when considered in conjunction with the accompanying drawings.

BRIEF DESCRIPTION OF THE DRAWINGS

FIG. 1 is a perspective view of a flange.

FIG. 2 is a side elevation view of the flange shown in FIG. 1.

FIG. 3 illustrates three conductive images prepared to conform to section views of the flange shown in FIG. 2, taken along the lines indicated as 1—1, 2—2 and 3—3 in FIG. 2.

FIG. 4 schematically illustrates three spaced apart conductive images separated by an electroset fluid under influence of the Winslow effect.

DETAILED DESCRIPTION OF THE INVENTION

Figure 5:
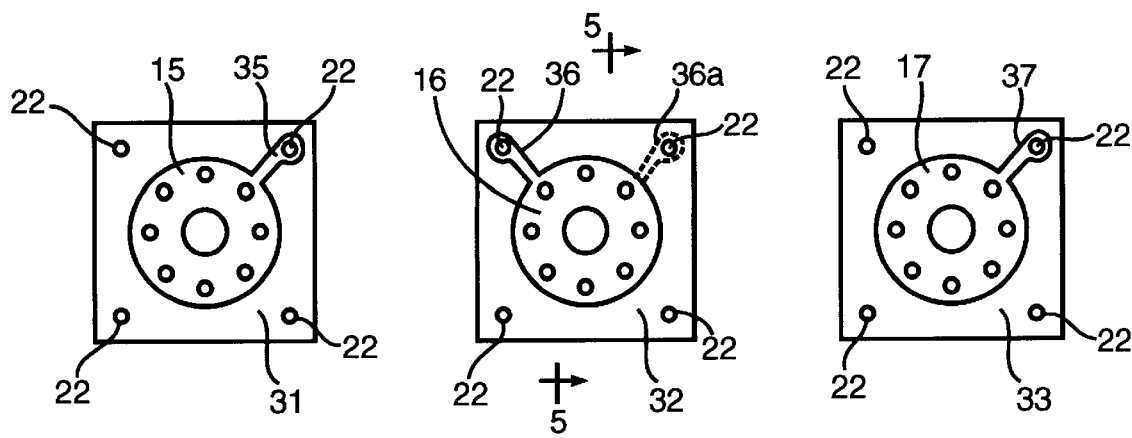
FIG. 5 illustrates three non conductive substrates having conductive images prepared to conform to section views of the flange shown in FIG. 2, taken along the lines indicated as 1—1, 2—2 and 3—3 in FIG. 2.

One embodiment of the invention will be illustrated by reference to FIG. 1 through FIG. 4. A perspective view of a simple flange 10 having a large center hole 11 and a plurality of peripheral holes identified as 12 is shown in FIG. 1. A side elevation view of the flange of FIG. 1 is shown in FIG. 2 and sections 1—1, 2—2 and 3—3 are identified. In FIG. 3, three conductive images are identified as 15, 16 and 17 with the form of 15, 16 and 17 corresponding to the form of a view taken at 1—1, 2—2 and 3—3, respectively. In FIG. 4, conductive images 15, 16 and 17 are shown in a spaced apart relationship and separated by an electroset composition identified as 19 which is held in place via the Winslow effect due to high voltage potential provided at contacts 23 and 25 for positive polarity and at contact 27 for negative polarity. Images 15, 16 and 17 are spaced apart during curing by suitable fixturing. Conductive images 15, 16 and 17 are made from any suitable material such as conductive fabric which may either be loosely or tightly woven and alternately conductive images 15, 16 and 17 are formed from sheet metal such as for example steel or aluminum. Conductive images 15, 16 and 17 are made by conventional means such as for example blanking and punching or die cutting. When images 15, 16 and 17 are made from loosely woven fabric, as particulate matter in the electroset composition lines up along the electric lines of flux, a cross bonded composite material results. It is not necessary that all of the conductive images be made of the same material. For example layers 15 and 17 may be made of solid metal and layer 16 may be made of conductive fabric or in any combination of metal and conductive fabric.

Figure 6:
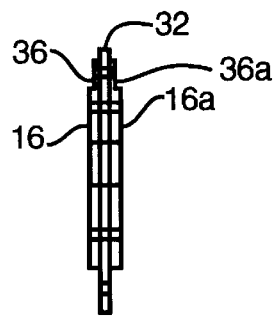
FIG. 6 is a section view of a portion of FIG. 5, taken along lines indicated as 5—5 in FIG. 5.

A second embodiment of the invention is illustrated in FIGS. 5 and 6. Referring now to FIG. 5, Conductive images 15, 16 and 17 are deposited on on insulating substrates 31, 32 and 33 respectively. Additionally, on the opposite side of substrate 32, is an image identified as 16a. Image 16a in the example shown is in registration with image 16 such that section their section views are identical. Electrically connected with images 15, 16, 16a and 17 are conductor paths 35, 36, 36a and 37 respectively so that electrical contact may be made with the images from a point near the periphery of their respective substrates.

In FIG. 6, substrates 31, 32, and 33 are shown in a spaced apart relationship which is maintained by conventional means such as spacers indicated graphically by arrows 41 which of course also maintain images 15 and 16 and images 16a and 17 in a spaced apart relationship. An electroset composition identified as 19 which is held in place via the Winslow effect due to high voltage potential provided by power supply 40 at contact points illustrated as 45 and 48 which make contact with conductor paths 35 and 37 respectively for positive polarity and at contact points illustrated as 46 and 47 which make contact with conductor paths 36 and 36a, respectively for negative polarity. Conductive images 15, 16, 16a, and 17 are deposited on their respective substrates by means such as hand drawing, screen printing, or preferably by a computer driven printer or plotter. During fabrication, the spaces between the image bearing substrates is flooded with an electroset composition 19 and the power supply energized. When the substrates are removed from the source of flooding, the volume between the electrically energized conductive images remains filled with fluid which is solidified under the Winslow effect and the volume between the substrate areas having no conductive images is substantially free of the electroset composition. Power is continued until electroset composition 19 cures as is taught by the referenced copending applications bonding to the images forming a composite article. Depending on the composition, the voltage required may vary up to about 5000 volts and the current density may vary up to about 5 ma/in$^2$ (0.78 mA/cm$^2$). After removal of the electrical connections, excess parts of the substrates are removed leaving only the configuration of the article originally defined only by the conducting images.

Figure 8:
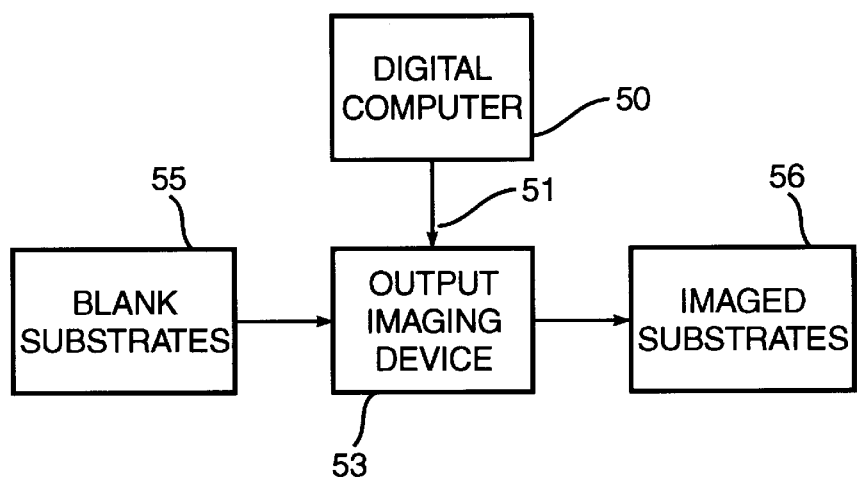
FIG. 8 illustrates a computerized process for making articles in accordance with the present invention.

Referring now to FIG. 8, an alternate embodiment of imaged substrate preparation is illustrated. Alternately, images 15, 16, 16a and 17 are generated in properly programmed digital computer 50 and communicated via communication link 51 to output imaging device 53. Output imaging device 53 is adapted to receive blank substrates from substrates source 55 and to discharge substrates such as for example 31, 32 and 33 bearing images 15, 16, 16a and 17 into a suitable container 56.

Computer 50 is a general purpose digital computer, such as for example an IBM PC desktop computer or a Zenith Data Systems desktop computer properly programmed with software for generating design images and producing sections of such images and is readily available in the commercial market. Output imaging device 53 may be a plotter, such as for example one manufactured by Houston Instruments or a laser printer such as for example, a Laserjet printer manufactured by the Hewlett Packard Corporation. When a laser printer is used as output imaging device 53, the standard printing powder must be replaced with an electrically conductive or electrically semiconductive powder. Such may comprise, but is not limited to carbon powder in the form of graphite powder. A suitable graphite powder is manufactured by Gougeon Brothers, Bay City Mich., and sold under the brand name West System 423. Insulating substrate 31, 32 and 33 are made of any suitable material that is compatible with the material to be electroset. One example of a suitable substrate is plastic viewgraph sheets sold by Konica Business Machines U.S.A., Inc., Windsor, Conn. High Voltage supply 40 preferably has the ability to independently limit voltage and current to predetermined maximums. Such a power supply is a high voltage direct current output poser supply, model PS/PH030P050, manufactured by Glassman High Voltage, Inc. in Whitestation, N.J. Suitable means for starting and stopping power application is convenient such as for example switch 49 located on power supply 40.

When a plotter is used as output imaging device 53, conductive ink must be used in the plotter pen. Such conductive ink may comprise a suitable commercially available product or may be fabricated using a formula of 10 parts acetone, 3 parts West System 423 graphite powder and one part clear adhesive such as for example that sold under brand name UHU and manufactured by the Linger & Fischer Co. which is located in West Germany, wherein the proportions are determined as parts by volume. A suitable plotter pen is a Rapidograph pen, size 9, produced by the Hohinor Company located in West Germany. Communications link 51 may for example, comprise any suitable communications bus such as for example a IEEE Bus produced by various manufacturers such as for example, Nevada Western of Sunnyvale, Calif. or by International Business Machines (IBM). Cans of acetone are sold by the Hechinger's Store in Annapolis, Md.

This invention will be further clarified by a consideration of the following examples, which are intended to be purely exemplary of the use of the invention.

EXAMPLE 1

Figure 7:
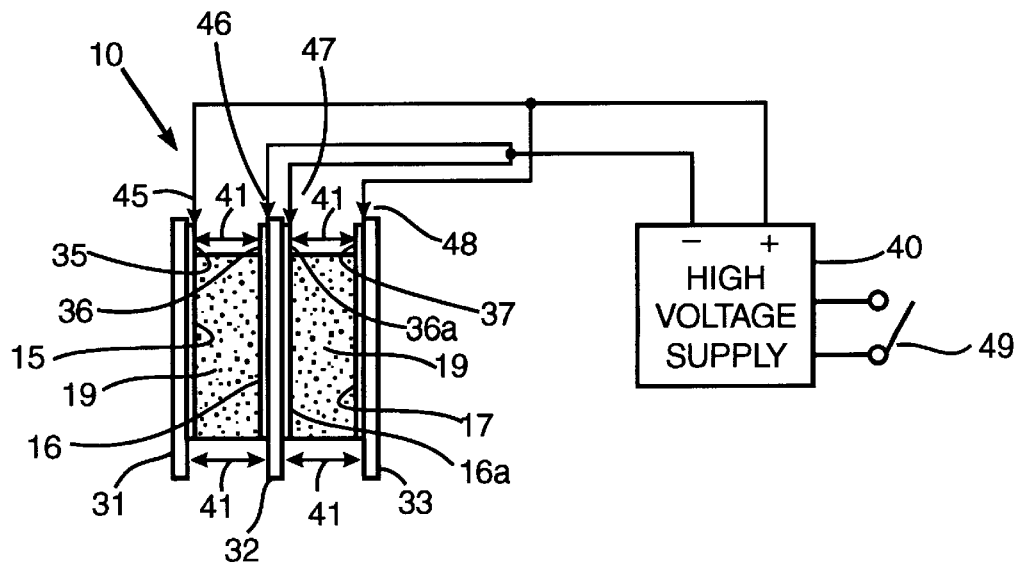
FIG. 7 schematically illustrates three spaced apart non conductive substrates having conductive images separated by an electroset fluid under influence of the Winslow effect.
Figure 9:
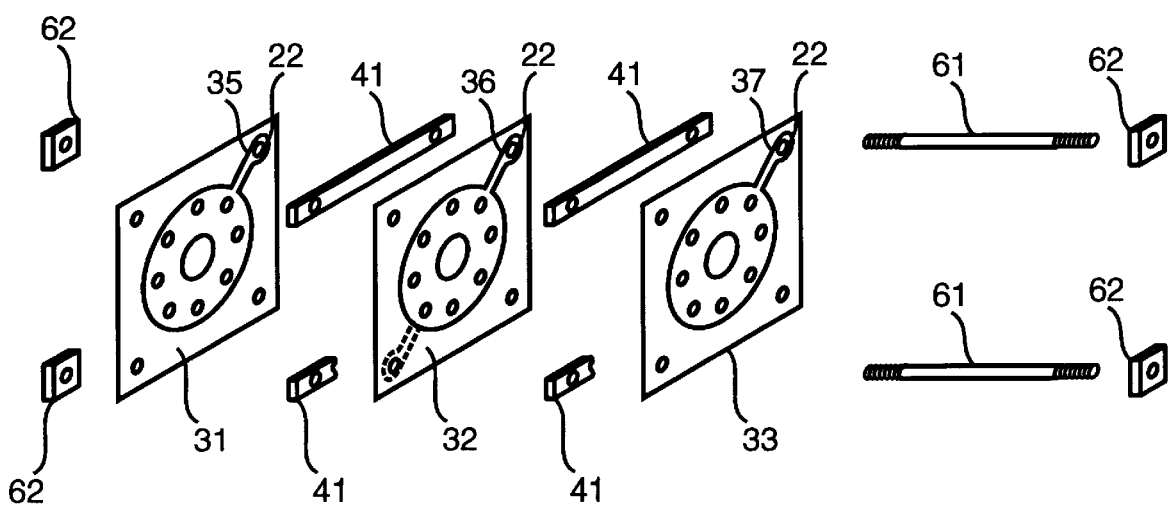
FIG. 9 illustrates a method used to fabricate a sample article.

Referring now to FIG. 7 through FIG. 9, a pipe flange 10 comprising electroset material solid 19 and substrate or laminate sheets 31, 32 and 33 was fabricated and constructed in accordance with the computer controlled process of the present invention. Conductive images were formed on a substrate by outputting computer images onto acetate viewgraph sheets as described above. Registration holes 22 were made in the periphery of substrate sheets 31, 32 and 33 in a region beyond the limits of images 15, 16, 16a, and 17 so that registration was maintained. In the sample fabricated, registration was maintained by sliding conductive threaded rods 61 through registration holes 22 in substrates 31, 32 and 33 and securing with nuts 62 as shown in FIG. 9. Substrates 31, 32 and 33 were separated with spacers 41 having holes 42. Spacers 41 are made from nonconductive materials such as for example, wood. Holes 22 and 42 are aligned such that one rod 61 extends through each aligned set of holes 22 and 42 in the order shown in FIG. 9. Although only two rods 61 and four nuts 62 are shown, one rod and associated nuts were used in each of the four corners.

Conductive paths 35, 36, 36a and 37 were adapted to encompass one of holes 22 on each substrate so that power could be distributed to images 15, 16, 16a and 17 via conductive threaded rods 61. Power supply 40 was adapted to supply current to opposing images 15 and 16 and 16a and 17. The spaced apart images were immersed in a container of electroset composition and the images energized capturing a portion of the fluid in the container via the Winslow effect. When the spaced apart images are withdrawn from the liquid electroset material, the portion of the fluid between the substrates which is not under the Winslow effect, falls back into the container. The power supply was set for a maximum voltage of 4 kilovolts (kv) and a maximum current of 30 milliamps (ma). The electroset material in the container was an electroset mixture made by mixing 12 parts Ultraglow Resin as manufactured by Environmental Technologies, Inc., Fields Landing California; 12 parts Ultraglow Hardner also manufactured by Environmental Technologies; 2 parts Devcon 5 minute epoxy resin; 2 parts Devcon 5 minute epoxy hardner; 16 parts Cornstarch powder as sold by Giant Foods, Inc., Landover Md.; and one part Giant Brand Acrylic Floor Finish, also as distributed by Giant Foods, Inc., Landover, Md., where the parts are defined as parts by volume. Electric power was supplied to the spaced apart images at a maximum voltage of 4 kilovolts and a maximum current of 30 milliamps until the electroset composition hardened sufficiently so that power could be removed without loss of electroset composition from the images. Thus, the material was electroshaped. The term electroshaped used herein means that an electric field applied to the electroset material 19 was used to control the resulting shape of an object, such as for example flange 10. The term electroshapable is be used in this disclosure to mean an electroset material that can be shaped by application of an electric field to the electroset material.

In the example presented above, the electroshapable material was an epoxy based electroset material. Other electroset materials as taught in my copending application and in my companion application are also usable in making composite articles such as presented in the foregoing example. The shape of the composite article is limited only to what can be defined in terms of views and sections of an article. If the views are drawn as a shoe sole, then a shoe sole is produced. The process is also usable where only two images are required and it is desired to separate the images from the finished article when the material has been electroset. When it is desired to separate the images from the article, a suitable mold release may be required.

It is appreciated that acetate sheets 31, 32 and 33 may be replaced with other substrate onto which the conductive images may be drawn. Different substrate materials may be used to provide improved strength and adhesion to the molded materials.

EXAMPLE 2

An electroshapable material mixture was mixed comprising 2 parts by volume clear satin polyurethane finish and 3 parts by volume cornstarch. The clear satin polyurethane is produced by the Yenkin-Majestic Paint Corp., Columbus, Ohio. A 4 inch (about 10 cm) diameter flange was fabricated by the electrically programmable molding process of the present invention. The process used was essentially the same as that described above in Example 1 except that a plurality of substrates 32 having images 16 and 16a were used between substrates 31 and 33. Similarly, spacers 41 were used between each adjacent pair of substrates as shown in FIG. 9. The cross-sectional design of the flange was drawn on the substrates using conductive ink and the images were connected to power supply 40 in a similar manner as that shown in FIG. 7 such that an electric field could be applied across each adjacent pair of images. Again, conductive rods 61 were used to provide registration and to conduct current in a similar manner as used in example 1. The spaced apart images were then immersed into an electroshapable mixture and energized with a maximum voltage of 4 kilovolts and a maximum current of 40 milliamps. The images were then removed from the mixture container. It was noted that some of the electroshapable mixture had solidified between the images and was held in position via the Winslow effect. After 25 minutes, it was noted that the mixture had set in that position via the second Reitz effect, that is, it had electroset. Afterward, the power supply was electrically disconnected from the images and allowed to cure over the next 24 hours.

Useful products are also made in accordance with the present invention by placing an insulating substrate between two electrodes and filling the space between the electrodes and the substrate with an electroset material. The insulating substrate may be in the form of an openweave or closed weave cloth. Open weave cloth is preferred because when the electroset material is under the influence of the Winslow effect, the particulate matter will tend to form columns along the electric lines of flux, thereby causing a composite structure to be formed which is bonded through the insulating substrate, increasing strength. After the curing is complete, the electrodes may be either removed or left in place forming a part of the structure. A plurality of insulating substrates may be used as well, causing a bond through a number of the insulating substrates, increasing strength. Additionally, the electrode plates may also be the platens of a press such that pressure may be applied simultaneously with an electric field.

EXAMPLE 3

Figure 10:
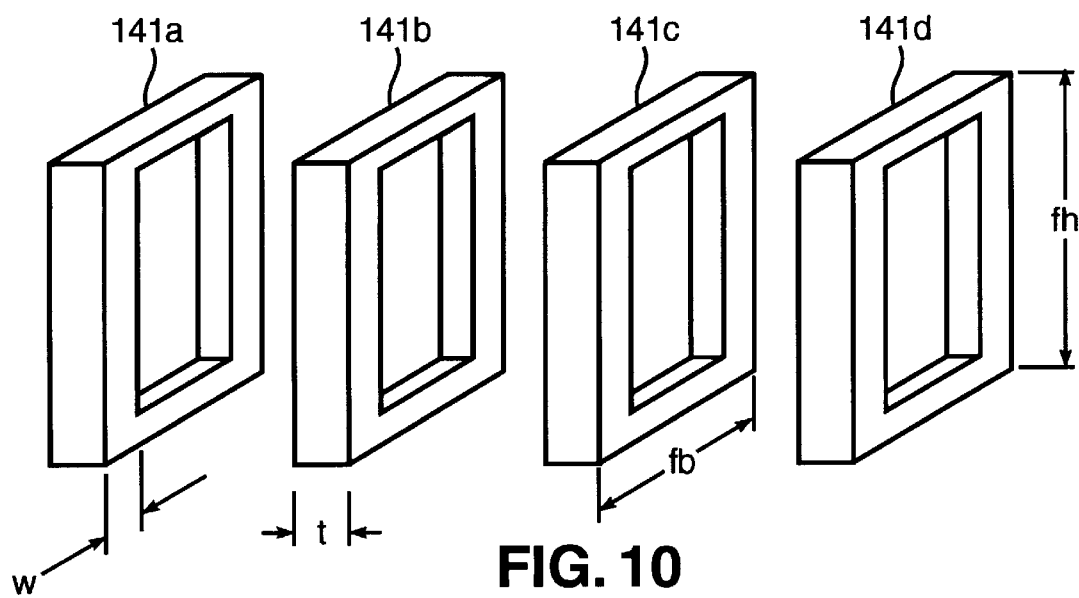
FIG. 10 is a perspective view of a set of four spacer frames used to make an electroset mold.

An electroset rectangular block that can be used as a paper weight was fabricated in a manner similar to that described in example 1. Four wooden picture frames suitable for 5 inch by 7 inch pictures were purchased at the K-Mart Store in Hyattsville, Md. The frames were manufactured by Lambert Inc. and sold by K-Mart Stores. The cardboard backings, the attached glass panes and the staples used to secure the glass panes and cardboards to the picture frames were removed. The picture frames 141a, 141b, 141c and 141d were 1.3 cm wide along the dimension indicated by the letter w in FIG. 10. Each of the picture frames 141a, 141b, 141c and 141d was sanded with sandpaper by hand along the facing of the frame until the thickness of each frame, which is indicated by the letter t in FIG. 10 was 6 millimeters. Each of the resulting frames thus had a thickness t of 6 millimeters, a width w of 1.3 centimeters, a height fh of 7.75 inches (about 19.5 cm) and a base fb of 5.75 inches (about 14.5 cm) where t, w, fh and fb are as shown in FIG. 10.

Figure 11:
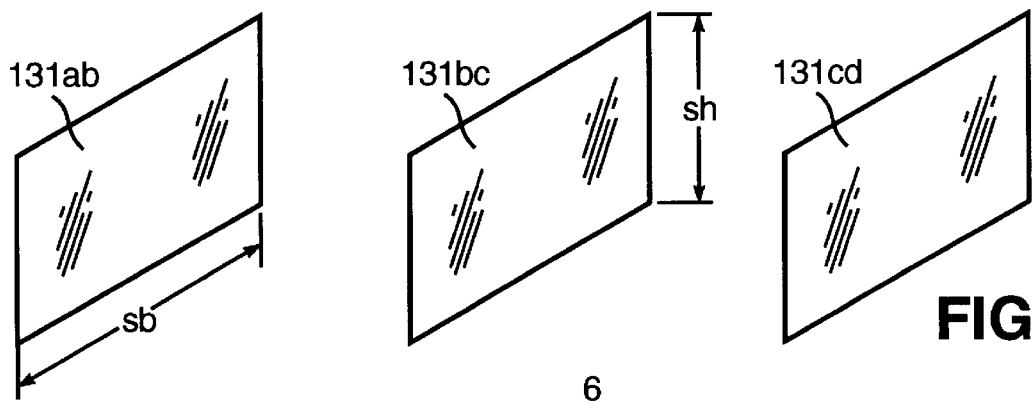
FIG. 11 is a perspective view of a set of three dielectric substrates used in making an electroset mold.
Figure 12:
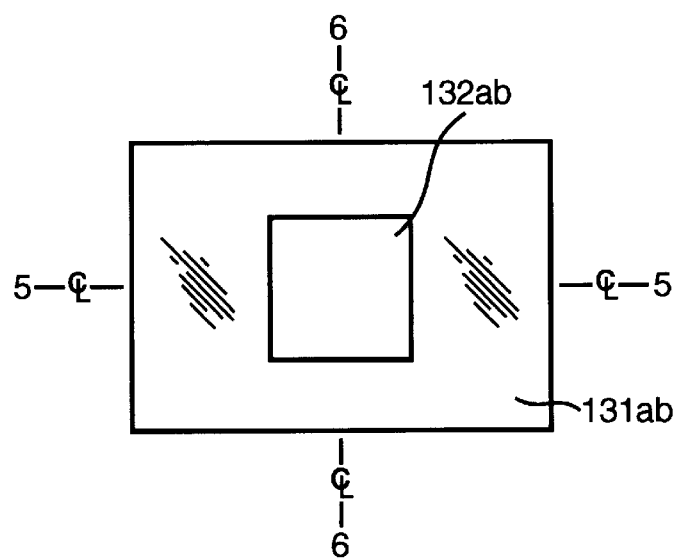
FIGS. 12, 13, 14, 15, 16, 17 and 18 illustrate dielectric substrates and electrodes deposited thereon.

Dielectric substrates 131ab, 131bc and 131cd as shown in FIG. 11, are rectangular clear plastic sheets, each with a base dimension sb of about 7 inches (about 17.6 cm) and which have a height sh of about 5 inches (about 12.6 cm), where sb and sh are as shown in FIG. 11. Dielectric substrates 131ab, 131bc and 131cd were fabricated by cutting by hand with scissors plastic viewgraph sheets that are marketed as item PP2500 under the Scotch trademark and are manufactured by the 3M Visual Systems Division, Austin, Tex. After forming substrates 131ab, 131bc and 131cd by cutting the sheets down into the dimensions noted in FIG. 11, dielectric substrate 131ab was laid on a flat desktop. A 2 inch by 2 inch square electrode 132ab as shown in FIG. 12 was deposited onto one side of substrate 131ab by hand using a paint brush to apply electrically conductive ink. The ink was of the same formulation as the electrically conductive ink discussed above, that is:

10 parts acetone;
3 parts West System 423 graphite powder; and,
1 part UHU clear adhesive.

Figure 13:
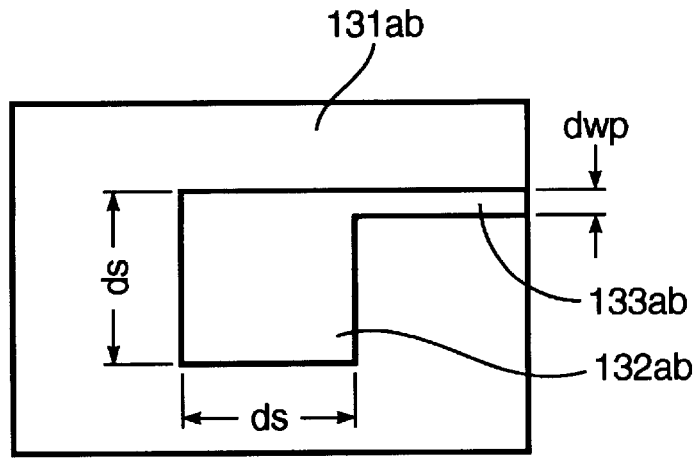

Electrode 132ab was drawn onto substrate 131ab so as to be centered on substrate 131ab as indicated by lines 5—5 and 6—6 of FIG. 12. Electrode path 133ab was then deposited onto substrate 131ab as shown in FIG. 13 such that path 133ab forms a conductive path from the right edge of substrate 131ab to electrode 132ab.

It is appreciated that instead of producing path 133ab and electrode 132ab by hand painting means, path 133ab and electrode 132ab could be deposited by computer controlled plotter, or alternatively, by laser printer as discussed above. After electrode 132ab and path 133ab were deposited, they were permitted to dry by exposure to room atmosphere. The length of the sides of electrode 132ab are indicated by the designation ds in FIG. 13 and was about 2 inches (about 5 cm). The width of electrically conductive path 133ab is indicated by the designation dwp in FIG. 13 and is about 0.25 inches (about 6.3 mm).

Figure 14:
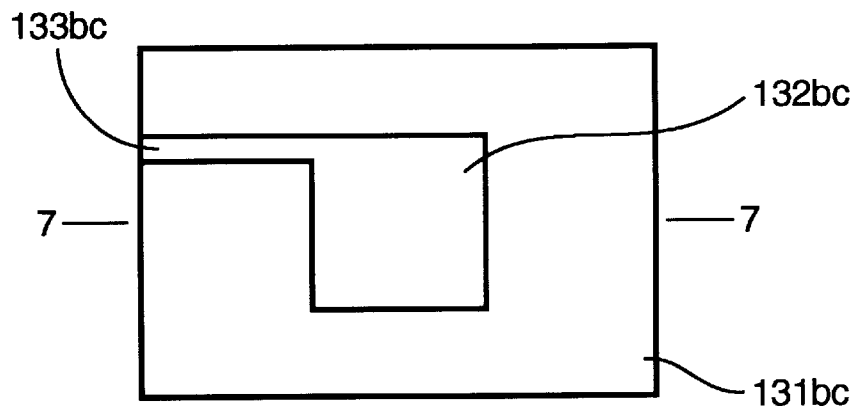

In the same manner as electrode 132ab and electrode path 133ab were deposited onto 131ab, electrode 132bc and electrode path 133bc were deposited onto dielectric substrate 131bc as shown in FIG. 14. Electrode 132bc is centered on substrate 131bc. After deposition, electrode 132bc and electrode path 133bc were permitted to dry in room atmosphere.

Figure 15:
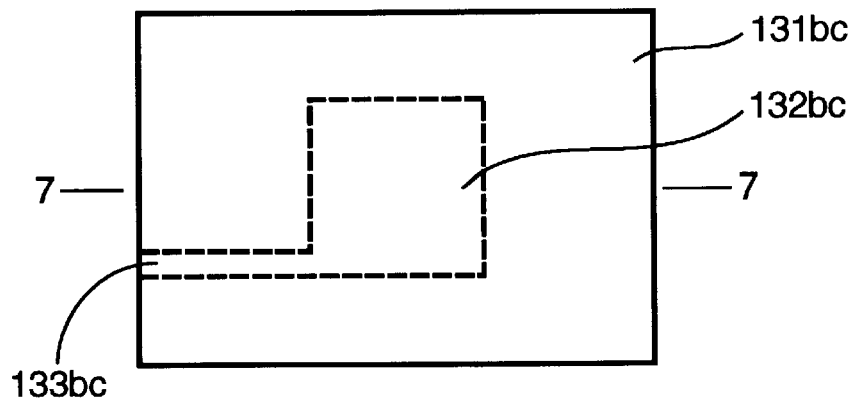

After the depositions had dried on substrate 131bc, substrate 131bc was turned over so that electrode 132bc and path 133bc face the desktop. Because substrate 131bc is clear, electrode 132bc and path 133bc underlying said substrate 131bc was visible by looking through substrate 131bc and is illustrated by dashed lines in FIG. 15. The exposed side of 131bc, that is to say, the side of substrate 131bc that had no electrode deposited thereon, was now ready to have an electrode deposited thereon.

Figure 16:
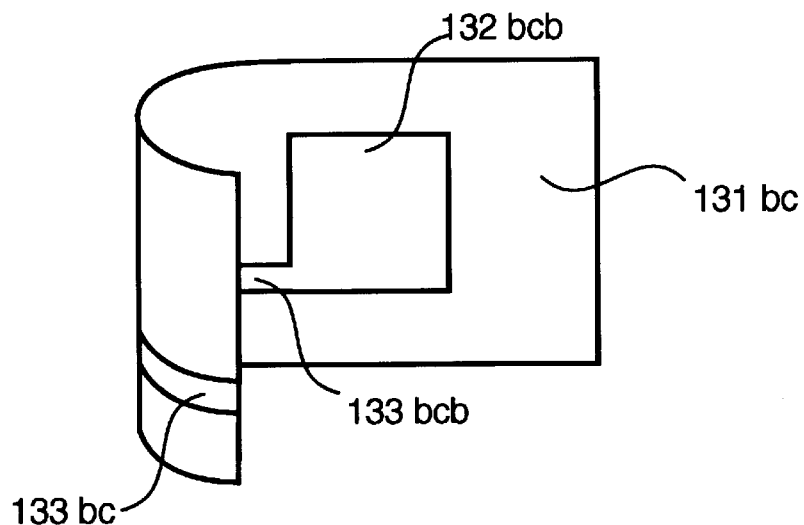
Figure 17:
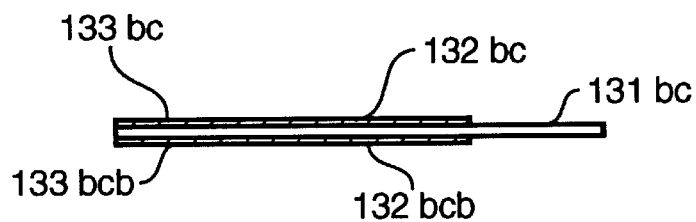

Electrode 132bcb and an accompanying electrically conductive path 133bcb were deposited onto 131bc on the surface of substrate 131bc which was on the opposite surface of substrate 131bc from which electrode 132bc and electrode path 133bc were deposited. This was also accomplished by applying electrically conductive ink to substrate 131bc by hand with a paint brush. Electrode 132bcb and electrode path 133bcb were permitted to dry in room atmosphere and the effort resulted in matching electrodes and their accompanying conductive paths on opposite sides of 131bc as shown in FIGS. 16 and 17.

Figure 18:
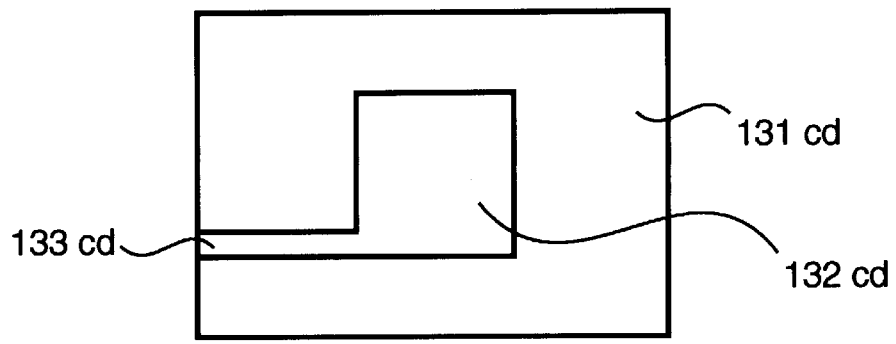

Referring now to FIG. 18, an electrode 132cd of the same dimensions as those of electrode 132ab was deposited onto substrate 131cd in the same manner as electrode 132ab was deposited onto substrate 131ab. Electrically conductive path 133cd was formed in the same manner onto substrate 131cd as electrode path 133ab was formed onto substrate 131ab. Similarly, path 133cd extended from the edge of substrate 131cd to electrode 132cd as shown in FIG. 18 and path 133cd similarly was formed so as to have a 0.25 inch (about 6.3 cm) width. Electrode 132cd and path 133cd were permitted to dry in room atmosphere.

After deposition of the electrodes on the substrates, frames 141a, 141b, 141c and 141d were prepared for the purpose of forming an electroset mold. All of the frames 141a, 141b, 141c and 141d were taped around with double sided tape, i.e., tape that has sticky adhesive on both sides.

Figure 25:
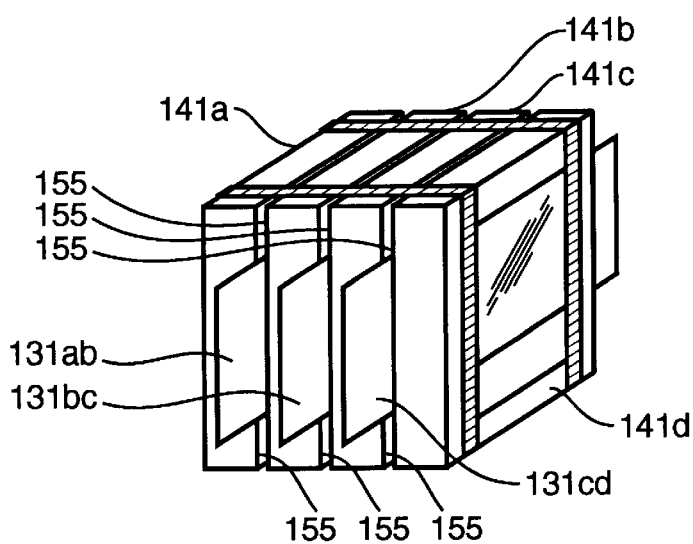
FIG. 25 is a perspective view of the electroset mold illustrated in sequentially illustrated in FIGS. 19–24.

The tape was applied on the surfaces indicated as 155 in FIG. 25. A suitable tape is Scotch brand double stick tape, catalogue number 136, manufactured by the 3M Consumer Products Group of St. Paul, Minn. The tape was applied to the wooden frame only and was not applied in any way that would obstruct the open area inside each of the frames.

Figure 19:
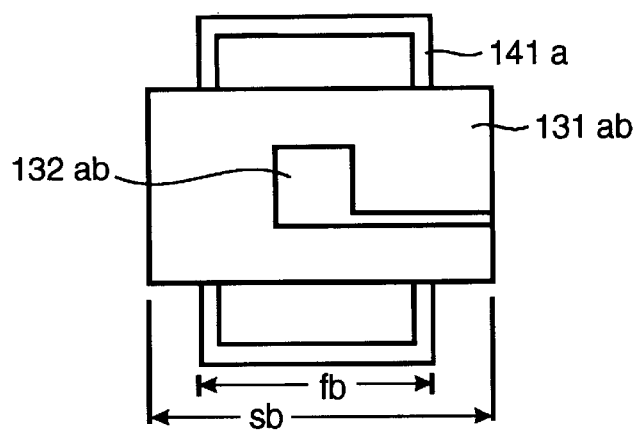
FIGS. 19, 20, 21, 22, 23 and 24 sequentially illustrate the placement and positioning of dielectric substrate with deposited electrodes and with respect to the spacer frames of an electroset mold.

After preparing the frames, electroset mold 145 was fabricated by sequentially laying up the frames and substrates as sequentially shown in FIGS. 19–24. First, frame 141a was placed on a flat desktop. Next, substrate 131ab was laid onto frame 141a as shown in FIG. 19, such that electrode 132ab faced away from the desk, and was centered onto frame 141a such that the base of substrate 131ab was parallel to base of frame 141a. It was noted that the double sided tape around frame 141a held substrate 131ab in position and that path 133ab extended from electrode 132ab to the right edge of substrate 131ab as shown in FIG. 19.

Figure 20:
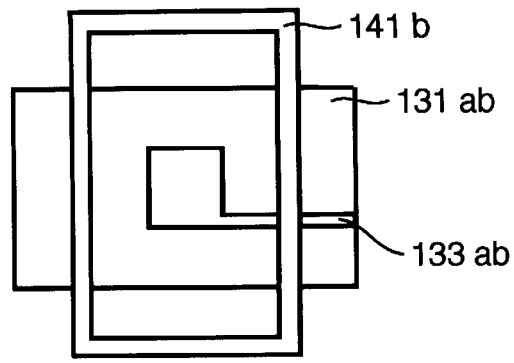
Figure 21:
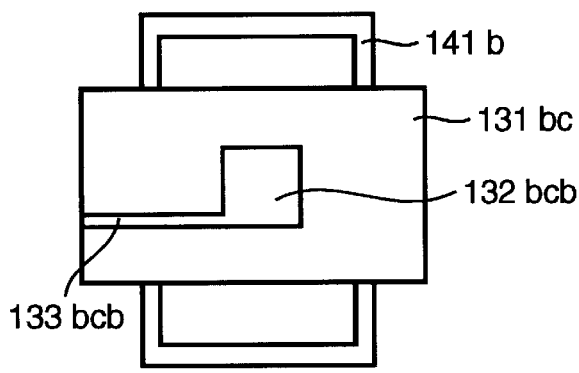

Frame 141b was then centered and placed onto substrate 131ab as shown in FIG. 20. such that frame 141b was in direct contact with path 133ab. Frame 141b was held into position by the double sided tape, adhering to substrate 131ab. Referring now to FIG. 21, substrate 131bc was then centered and placed onto frame 141b such that electrode 132bc faced toward electrode 132ab. It was observed that electrode 132bcb faced away from the desk and electrically conductive paths 133bc and 133bcb extended from electrodes 132bc and 132bcb, respectively, to the left edge of substrate 131bc.

Figure 22:
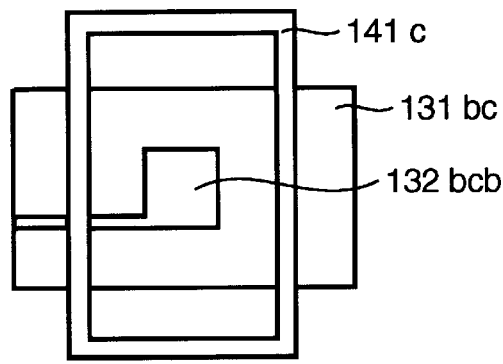
Figure 23:
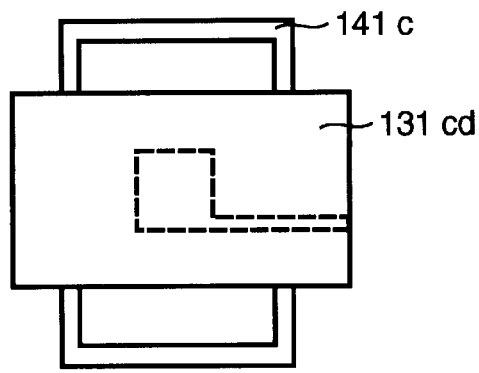
Figure 24:
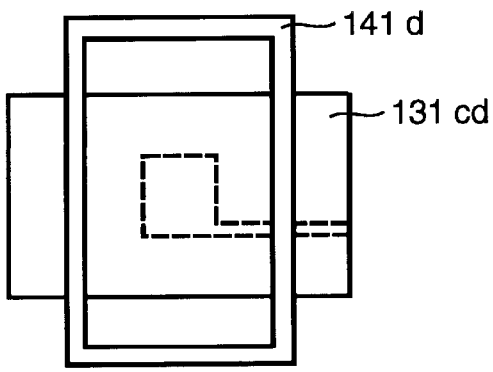

Frame 141c was then centered on and placed onto substrate 131bc as shown in FIG. 22. Substrate 131cd was then centered on and placed onto frame 141c such that electrode 132cd faced electrode 132bcb and also faced toward the desk. The position of substrate 131cd and electrode 132ab was such that electrically conductive path 133cd extended from electrode 132ab to the right edge of substrate 131cd. The side of substrate 131cd that had no electrode deposited thereon faced away from the desk as shown in FIG. 23. Frame 141d was then centered on and placed onto substrate 131cd as shown in FIG. 24. Although each frame was held to its adjacent substrate by double sided tape, mold 145 was completed by positioning rubber bands 150 and 151 around the edges of the entire set of frames and substrates as shown in FIG. 25. Rubber bands 150 and 151 serve as additional means to hold together mold 145 which comprised frames 141a, 4141b, 141c, 141d and substrates 131ab, 131bc and 131cd as shown in FIG. 25. Rubber bands 150 and 151 are manufactured by A&W Products, Inc. located in Port Jervis, N.Y. and were packaged in a 1.5 oz A&W Assorted Rubber Band package. The bands used in the example constructed were purchased at the Peoples Drug Store in Lanham, Md.

As shown in FIGS. 19–25, substrates 131ab, 131bc and 131cd were so positioned with respect to frames 141a, 141b, 141c and 141d that the sb dimension (See FIG. 11) of substrates 131ab, 131bc and 131cd was parallel to the fb base dimension (See FIG. 10) of frames 141a, 141b, 141c and 141d. As is evident from FIG. 25, such positioning of the substrates 131ab, 131bc and 131cd resulted in a gap between the top and bottom edges of substrates 131ab, 131bc and 131cd and the top and bottom interior edges of frames 141a, 141b, 141c and 141d. This gap later permitted unenergized electroset fluid to flow through the volume between electrodes 132ab and 132bc and through the volume between electrodes 132bcb and 132cd when mold 145 was immersed in and later removed from a bath of electroset fluid.

Figure 26:
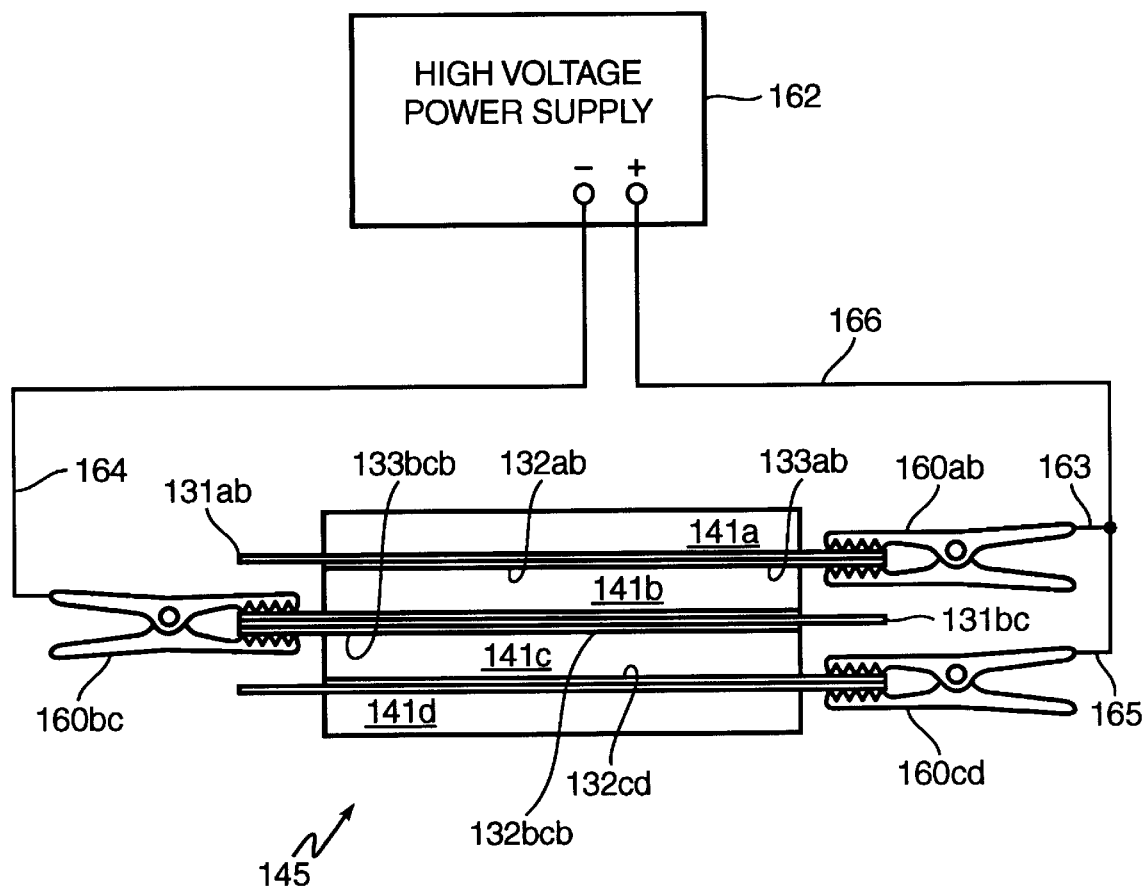
FIG. 26 illustrates the arrangement of electrical circuitry for energizing the mold illustrated in FIG. 25.

Referring now to FIG. 26, electrode alligator clips 160ab, 160bc and 160cd, are connected to the electrode paths of substrates 131ab, 131bc and 131cd, respectively. Clip 160ab contacts electrode path 133ab; clip 160cd contacts electrode path 133cd; and clip 160bc contacts both electrode paths 133bc and 133bcb on opposite sides of substrate 131bc. Clips 160ab and 160cd are commonly connected via electrical conductors 163 and 165 which in turn are commonly connected to the positive terminal of power supply 162 via electrical conductor 166. Clip 160bc is electrically connected to the negative terminal of power supply 162 via electrical conductor 164. High voltage power supply 162 comprises a High Voltage Power Supply model PS/PH030P050 which is manufactured by Glassman High Voltage, Inc. of Whitestation, N.J. High voltage power supply 162 is a D.C. high voltage power supply that has the built in capability to adjustably and indepently limit the voltage and current to predetermined maximums. Suitable alligator clips are stock number 28F496 or alternatively stock number 44F1490 of the Newark Electronics catalog 107, which is published for Newark Electronics, Inc., Chicago, Ill.

After the establishment of the arrangement shown in FIG. 26, electroset mold 145 was immersed in a 5 gallon bath of eletroset fluid comprising by volume: 10 parts cornstarch, 20 parts Dow Corning SF 200 silicone oil, 10 parts General Electric RTV silicone rubber 5010 and 0.1 parts West System 423 graphite powder. Dow Corning SF 200 is manufactured by Dow Corning located in Midland, Mich. and General Electric RTV silicone rubber 5010 is manufactured by the General Electric Company Silicone Products Division located in Waterford, N.Y. The power supply 162 was then turned on and the output voltage and current set to maximums of 7.5 kilovolts and 25 milliamps, respectively. Thirty seconds after the electric power was applied to mold 145, mold 145 was removed from the bath of electroset fluid. Electric power to the mold was maintained for a period of 45 minutes and thereafter the power supply was turned off. Mold 145 was then permitted to stand for 5 days. Mold 145 was thereafter disassembled and substrates 131ab, 131bc and 131cd with the electroset rectangular block object were removed. That part of substrates 131ab, 131bc and 131cd in excess of the object were subsequently cut off and removed by hand using scissors. The resulting rectangular electroset object block measured approximately 2 inches high by 2 inches long by 1 inch wide.

Materials that have been formed from electroset compositions using the electroset process have unique properties. As a result of the aggregate particles aligning along the electric lines of flux, it is observed that often the resulting electroset article has aligned columns of material embedded in the cured material. In some compositions, the alignment is visible with the unaided eye. Such alignment is useful in identifying materials that have been produced through the use of the electroset process. Other potential means of identifying such articles may be found, such as for example, identification of trace poylmers that are produced only when the material is cured in the presence of a field. Such identification may include the use of infrared spectroscopy and nuclear magnetic resonance (NMR) detection and mapping. Electroset articles having a (polymer-particulate-polymer-particulate-polymer . . . ) structural periodicity that can be mapped using NMR and other detection means can be identified as having been made using the electroset process. Other detection means, such as for example, X-ray detraction, Bragg reflection mapping and electron detraction may also prove useful in detecting the periodicity characteristics.

It will be readily appreciated in the light of this disclosure that articles of diverse geometries and constituent parts other than those specifically disclosed herein can be fabricated or constructed without deviating from the scope and spirit of this invention. Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What it claimed is:

1. A composite article, comprising:

a first electrically conductive substrate;

a second electrically conductive substrate spaced apart from said first electrically conductive substrate;

a cured electrosetting composition between said first and second substrates, said cured electrosetting composition having embedded therein voids and having embedded therein columns of aligned particles;

said voids and columns having been produced by the application of an electric current to said electrosetting composition during the time when said composition was curing, said electric current having an electric current density of at least 0.667 milliamps per square inch;

wherein said electrosetting composition comprises, in an uncured state, a phase changing vehicle and an aggregate, said phase changing vehicle being both a dielectric and a polymer, said aggregate comprising particles which will polarize in an electric field, said uncured electrosetting composition being capable of carrying an electric current density of at least 0.667 milliams per square inch.

2. A composite article as claimed in claim 1 wherein the compressibility of said cured composition was altered by at least 5% from that which would have been obtained if the composition had cured without the said application of an electric current.

3. A composite article as claimed in claim 1 wherein the hardness of said cured composition was altered by at least 5% from that hardness which would have been obtained if the composition had cured without the said application of an electric current.

4. A composite article as claimed in claim 1, said article having been produced by the following process:

a) providing a quantity of said uncured electrosetting composition;

b) positioning a first portion of said electrosetting composition between said first and second substrates;

c) charging said first And second substrates such that said charging causes an electric current through said composition, said electric current having an electric current density of at least 0.667 milliamps per square inch, and wherein said composition solidifies electrically in the manner of an electrorheological fluid while the quantity of said electrosetting composition which was not placed between substrates remains fluid and wherein the cure of said solidified portion of said composition is responsive to said charging such that the cure of said portion is accelerated;

d) separating said solidified portion of said electrosetting composition from said fluid portion of said electrosetting composition; and e) maintaining said charging so as to produce voids within and to alter the density of the composition by at least 5% and until said electrosetting composition has cured.

5. A composite article as claimed in claim 4 wherein the compressibility of said cured composition was altered by at least 5% from that which would have been obtained if the composition had cured with no charging of said substrates, said alteration of compressibility occurring during the time of and being responsive to the charging and maintaining said charging of said conductive substrates.

6. A composite article as claimed in claim 4 wherein the hardness of said cured composition was altered by at least 5% from that hardness which would have been obtained if the composition had cured with no charging of said conductive substrates, said alteration of said hardness occurring during the time of and being responsive to the charring and maintaining said charging of said conductive substrates.

7. A composite article as claimed in claim 1 wherein at least one of said substrates is comprised of a woven fabric.

8. A composite article as claimed in claim 1, said article having been produced by the following process:

a) providing a quantity of said uncured electrosetting composition;

b) positioning said uncured electrosetting composition between said conductive substrates;

c) charging said substrates such that said charging causes the alignment of said particles within, and an electric current through, said composition, said electric current having an electric current density of at least 0.667 milliamps per square inch;

d) maintaining said charging so as to form voids within said composition thereby altering the density of the composition by at least 5% from that density which would be obtained if said composition were to cure with no charging of said substrates; and e) maintaining said charging until said electrosetting composition has cured.

9. A composite article as claimed in claim 8 wherein at least one of said substrates is comprised of a woven fabric.

10. A composite article as claimed in claim 8 wherein the compressibility of said composition was altered by at least 10% during the time of charging and maintaining said charging of said conductive substrates.

11. A composite article as claimed in claim 8 wherein the hardness of said composition was altered by at least 10% during the time of charring and maintaining said charging of said conductive substrates.

12. A composite article as claimed in claim 1 wherein a third electricically conducting substrate is included, said third substrate being located between said first and second substrates and spaced apart from each of said first and second substrates.

13. A composite article, comprising:

a cured electrosetting composition containing voids and aligned particles;

said composition comprising, in an uncured state, a phase changing vehicle and particles, said phase changing vehicle being both a dielectric and a polymer, said particles tending to polarize in an electric field;

said voids and alignment of said particles within said article having been produced by the following process:

a) providing a first electrically conductive substrate;

b) providing a second electrically conductive substrate spaced apart from said first electrically conductive substrate;

c) providing a quantity of uncured electrosetting composition, said uncured electrosetting composition comprising a phase changing vehicle and particles, said phase changing vehicle being both a dielectric and a polymer, said particles tending to polarize in an electric field, said composition being capable of carrying an electric current density of at least 0.667 milliamps per square inch;

d) positioning said uncured electrosetting composition between said conductive substrates;

e) charging said substrates such that said charging causes said alignment of said particles within, and an electric current through, said composition, said electric current having an electric current density of at least 0.667 milliamps per square inch;

f) maintaining said charging so as to form voids within said composition so as to alter the density of said cured composition by at least 5% from that density which would be obtained if said composition were to cure with no charging of said substrates; and g) maintaining said charging until said electrosetting composition has cured.

14. A composite article as claimed in claim 13 wherein the density of said composition was altered by at least 10% during the time of charging and maintaining said charging of said conductive substrates.

15. A composite as claimed in claim 13 wherein at least one of said substrates is comprised of a woven fabric.

16. A composite article as claimed in claim 13 wherein the hardness of said composition was altered by at least 10% during the time of charging and maintaining said charging of said conductive substrates.

17. A composite article, comprising:

a cured electrosetting composition having embedded therein voids and columns of aligned particles;

said article having been produced by the following process:

a) providing a first electrically conductive substrate;

b) providing a second electrically conductive substrate spaced apart from said first electrically conductive substrate;

c) providing a quantity of electrosetting composition, said electrosetting composition comprising a phase changing vehicle and an aggregate, said phase changing vehicle being both a dielectric and a polymer, said aggregate comprising particles which will polarize in an electric field, said electrosetting composition being capable of carrying an electric current density of at least 0.667 milliamps per square inch;

d) positioning said electrosetting composition between said first and second substrates;

e) charging said first and second substrates such that said charging causes the alignment of said particles within, and an electric current through, said composition, said electric current having an electric current density of at least 0.667 milliamps per square inch;

f) maintaining said charging so as to produce voids within, and to alter the density of, the composition by at least 5% and until said electrosetting composition has cured; and g) removing at least one of said substates after said composition has cured.

18. A composite article as claimed in claim 17 wherein the density of said composition was altered by at least 10% during the time of charging and maintaining said charging of said conductive substrates.

19. A composite article as claimed in claim 17 wherein at least one of said substrates is comprised of a woven fabric.

20. A composite article as claimed in claim 17 wherein the compressibility of said composition was altered by at least 10% during the time of charging and maintaining said charging of said conductive substrates.

* * * * *